United States Patent
Chrysanthakopoulos et al.

(10) Patent No.: US 7,299,169 B2
(45) Date of Patent: *Nov. 20, 2007

(54) DEVICE DRIVER AUTO-LOAD

(75) Inventors: Georgios Chrysanthakopoulos, Kirkland, WA (US); Scott Fierstein, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 563 days.

This patent is subject to a terminal disclaimer.

(21) Appl. No.: 10/990,989

(22) Filed: Nov. 18, 2004

(65) Prior Publication Data

US 2005/0097573 A1 May 5, 2005

Related U.S. Application Data

(63) Continuation of application No. 09/604,365, filed on Jun. 27, 2000, now Pat. No. 7,058,563, which is a continuation-in-part of application No. 09/159,522, filed on Sep. 23, 1998, now Pat. No. 6,574,588.

(51) Int. Cl.
*G06F 9/455* (2006.01)

(52) U.S. Cl. .................................. 703/24; 717/176
(58) Field of Classification Search ............... 703/24; 717/176

See application file for complete search history.

(56) References Cited

U.S. PATENT DOCUMENTS

| | | | |
|---|---|---|---|
| 4,787,026 A | 11/1988 | Barnes et al. |
| 4,984,149 A | 1/1991 | Iwashita et al. |
| 5,131,089 A | 7/1992 | Cole |
| 5,291,584 A | 3/1994 | Challa et al. |
| 5,339,432 A | 8/1994 | Crick |
| 5,371,885 A | 12/1994 | Wetwin |
| 5,446,855 A | 8/1995 | Dang et al. |
| 5,454,098 A | 9/1995 | Pisello et al. |
| 5,457,784 A | 10/1995 | Wells et al. |
| 5,459,850 A | 10/1995 | Clay et al. |
| 5,465,364 A | 11/1995 | Lathrop et al. |
| 5,473,765 A | 12/1995 | Gibbons et al. |
| 5,491,813 A | 2/1996 | Bondy et al. |

(Continued)

OTHER PUBLICATIONS

Texas Instruments, Inc., "Serial ROM Data Format for IEEE 1394, Open HCI Implementations, Application Report," IEEE 1394 Configuration ROM, Texas Instruments, Inc., 1998, pp. 1-10.

(Continued)

*Primary Examiner*—Paul Rodriguez
*Assistant Examiner*—Dwin McTaggart Craig
(74) *Attorney, Agent, or Firm*—Banner & Witcoff, Ltd.

(57) ABSTRACT

Methods and apparatus are provided for automatically loading drivers on computers for devices coupled to a communication medium such as an IEEE 1394 serial bus. Operating systems running on the computers detect when a device is connected to the communication medium. The operating systems then determine whether one of the drivers stored in memory on the device will enable the computers to utilize the device. The operating systems will then load the appropriate drivers for their respective computers and allow access to the device. If none of the drivers on the memory are suitable for a particular computer, then its operating system will prompt a user to manually insert a computer-readable medium containing the appropriate drivers. Thus, the present invention provides methods and apparatus for automatically loading device drivers.

2 Claims, 3 Drawing Sheets

U.S. PATENT DOCUMENTS

| | | |
|---|---|---|
| 5,499,378 A | 3/1996 | McNeill, Jr. et al. |
| 5,546,585 A | 8/1996 | Soga |
| 5,548,783 A | 8/1996 | Jones et al. |
| 5,694,583 A | 12/1997 | Williams et al. |
| 5,717,903 A | 2/1998 | Bonola |
| 5,751,975 A | 5/1998 | Gillespie et al. |
| 5,784,581 A | 7/1998 | Hannah |
| 5,809,331 A | 9/1998 | Staats et al. |
| 5,815,678 A | 9/1998 | Hoffman et al. |
| 5,890,014 A | 3/1999 | Long |
| 5,909,559 A | 6/1999 | So |
| 5,915,106 A | 6/1999 | Ard |
| 5,946,469 A | 8/1999 | Chidester |
| 5,953,516 A | 9/1999 | Bonola |
| 5,958,020 A | 9/1999 | Evoy et al. |
| 5,968,152 A | 10/1999 | Staats |
| 5,991,777 A | 11/1999 | Momoh et al. |
| 6,006,029 A | 12/1999 | Bianchi et al. |
| 6,009,480 A | 12/1999 | Pieso |
| 6,012,103 A | 1/2000 | Savtore et al. |
| 6,064,566 A | 5/2000 | Agata et al. |
| 6,073,188 A | 6/2000 | Fleming |
| 6,073,205 A | 6/2000 | Thomson |
| 6,223,267 B1 | 4/2001 | Hodges et al. |
| 7,058,563 B1 | 6/2006 | Chrysanthakopoulos et al. |

OTHER PUBLICATIONS

Anthony Ralston et al., "Encyclopedia Of Computer Science, Third Edition", 1993, 9 pages.

William F. Alexander, *A WDM IEEE 1394* Configuration ROM Decoder, Dr. Dobb's Journal, Dec. 1999.

DEVICE DRIVER AUTO-LOAD

CROSS-REFERENCE TO RELATED APPLICATION

This application is a continuation of U.S. patent application Ser. No. 09/604,365, filed Jun. 27, 2000 now U.S. Pat. No. 7,058,563, which is a continuation-in-part of U.S. patent application Ser. No. 09/159,522 entitled "Solid-State Memory Device that Emulates a Known Storage Device," which was filed on Sep. 23, 1998 now U.S. Pat. No. 6,574,588, the specification and drawings of which are incorporated herein by reference in their entirety.

FIELD OF THE INVENTION

This invention relates to automatic loading of device drivers. In particular, this invention pertains to a method and apparatus for automatically loading drivers for devices coupled to a communication medium such as an IEEE 1394 serial bus.

BACKGROUND OF THE INVENTION

A device driver is a program routine that links a peripheral device to an operating system running on a computer. It is written by programmers who understand the detailed knowledge of the device's command language and characteristics and contains the precise machine language necessary to perform the functions requested by the application. Every peripheral device requires a driver. The drivers provide the detailed instructions necessary to activate and control the device.

When a new hardware device is added to the computer, such as a display adapter, sound card or CD-ROM drive, its driver must be installed in order to run it. Similarly, when a new peripheral device is connected to one or more computers through a communication medium such as a serial bus, a driver for the peripheral device must be installed for each operating system on each computer. In either case, the operating system calls the driver, and the driver "drives" the device.

Unfortunately, manufacturers generally provide drivers for peripheral devices on floppy disks or CD-ROMs. Thus, whenever a new device is to be installed on a computer, the operating system prompts the user to insert the computer-readable medium containing the appropriate driver. This is especially problematic when the peripheral device is coupled to a serial bus such as an IEEE 1394 (aka FireWire™, I.LINK™) bus, where multiple computers may need to simultaneously or sequentially load drivers for the device.

Accordingly, it is an object of the present invention to provide methods and apparatus for automatically loading drivers for devices coupled to a communication medium such as an IEEE 1394 serial bus.

SUMMARY OF THE INVENTION

The present invention can be broadly summarized as follows. In a system including at least one computer and at least one device having at least one driver stored in memory on the device, the computer and device coupled through a communication medium, the present invention provides a method of automatically loading the driver. The computer detects when the device is connected to the communication medium. The computer determines whether a suitable driver is stored in memory on the device. If the driver is correct for usage with the computer, the computer loads the driver from the memory on the device.

Of course, the methods and computer-executable instructions of this embodiment may also include other additional components and/or steps.

Other embodiments are disclosed and claimed herein as well.

BRIEF DESCRIPTION OF THE DRAWINGS

The present invention may take physical form in certain parts and steps, embodiments of which will be described in detail in this specification and illustrated in the accompanying drawings which form a part hereof, wherein.

DETAILED DESCRIPTION OF THE INVENTION

The present invention provides an automated solution for installing device drivers for IEEE-1394 enabled devices. In particular, this invention overcomes the problems of the prior art by preferably storing device drivers (and/or other installation/configuration files) for one or more operating systems on a peripheral device's configuration ROM (CROM) or other non-volatile memory. When the device is connected to an IEEE 1394 bus, each computer's operating system will automatically detect the device and read certain key information of the device CROM to determine whether the driver information is stored in the CROM. If the device is a legacy device, the user is instructed to manually load the requisite drivers. If the device is manufactured in accordance with the present invention, the operating system automatically loads the drivers and other files from the CROM. Thus, this invention provides for automatic loading of drivers for IEEE 1394-enabled devices.

Figure 1:
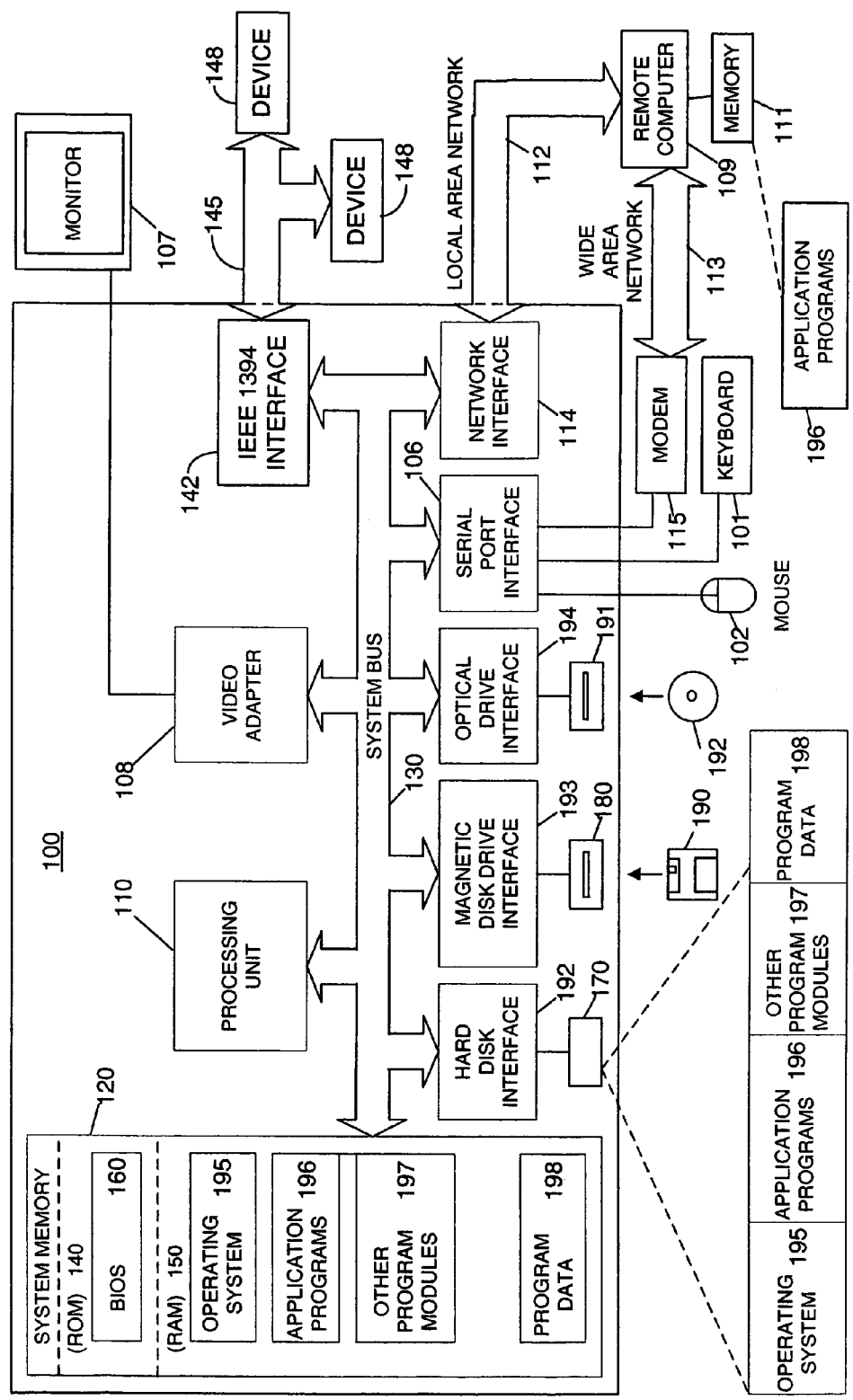
FIG. 1 is a schematic block diagram of a conventional general-purpose digital computing environment that can be used to implement various aspects of the present invention.

FIG. 1 is a schematic diagram of a conventional general-purpose digital-computing environment that can be used to implement various aspects of the present invention. A computer 100 includes a processing unit 110, a system memory 120 and a system bus 130 that couples various system components including the system memory to the processing unit 110. The system bus 130 may be any of several types of bus structures including a memory bus or memory controller, a peripheral bus, and a local bus using any of a variety of bus architectures. The system memory 120 includes a read only memory (ROM) 140 and a random access memory (RAM) 150.

A basic input/output system (BIOS) 160 containing the basic routines that help to transfer information between elements within the computer 100, such as during start-up, is stored in ROM 140. Computer 100 also includes a hard disk drive 170 for reading from and writing to a hard disk (not shown), a magnetic disk drive 180 for reading from or writing to a removable magnetic disk 190, and an optical disk drive 191 for reading from or writing to a removable optical disk 192, such as a CD ROM or other optical media. Hard disk drive 170, magnetic disk drive 180, and optical disk drive 191 are respectively connected to the system bus 130 by a hard disk drive interface 192, a magnetic disk drive interface 193, and an optical disk drive interface 194. The drives and their associated computer-readable media provide nonvolatile storage of computer readable instructions, data structures, program modules and other data for the computer 100. It will be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs), and the like, may also be used in the exemplary operating environment.

A number of program modules can be stored on the hard disk, magnetic disk 190, optical disk 192, ROM 140 or RAM 150, including an operating system 195, one or more application programs 196, other program modules 197, and program data 198. In particular, the RAM 150 will, from time to time, store various device drivers, as known in the art. A user can enter commands and information into computer 100 through input or selection devices, such as a keyboard 101 and a pointing device 102. The pointing device 102 may comprise a mouse, touch pad, touch screen, voice control and activation or other similar devices. Other input devices (not shown) may include a microphone, joystick, game pad, satellite dish, scanner, or the like. These and other input devices are often connected to the processing unit 110 through a serial port interface 106 that is coupled to the system bus, but may be connected by other interfaces, such as a parallel port, a game port or a universal serial bus (USB). A monitor 107 or other type of display device is also connected to system bus 130 via an interface, such as a video adapter 108. In addition to the monitor, personal computers typically include other peripheral output devices (not shown), such as speakers and printers.

An IEEE 1394 interface 142 may also be provided. The IEEE 1394 interface 142 couples an IEEE 1394-compliant serial bus 145 to the system bus 130 or similar communication bus. The IEEE 1394-compliant serial bus 145, as known in the art, allows multiple devices 148 to communicate with the computer 100 and each other using high-speed serial channels. The IEEE-1394 high-performance serial bus standard is based largely upon the internationally adopted ISO/IEC 13213 (ANSI/IEEE 1212) CSR Architecture Specification and the IEEE 1394-1995 Serial Bus Specification, the teachings of which are herein incorporated by reference. Additional buses such as the PCI bus can be provided in computer 100 and interfaced to the IEEE 1394 and other buses.

A typical serial bus having an IEEE 1394 standard architecture is comprised of a multiplicity of nodes that are interconnected via point-to-point links, such as cables, that each connects a single node of the serial bus to another node of the serial bus. The nodes themselves are addressable entities that can be independently reset and identified. Nodes are logical entities, each with a unique address. Each node provides a so-called configuration ROM (read-only memory)—hereinafter referred to as configuration memory—and a standardized set of control registers that can be accessed by software residing within the computer system.

The computer 100 can operate in a networked environment using logical connections to one or more remote computers, such as a remote computer 109. The remote computer 109 typically includes at least some of the elements described above relative to the computer 100, although only a memory storage device 111 has been illustrated in FIG. 1. The logical connections depicted in FIG. 1 include a local area network (LAN) 112 and a wide area network (WAN) 113. Such networking environments are commonplace in offices, enterprise-wide computer networks, intranets and the Internet.

When used in a LAN networking environment, the computer 100 is connected to local network 112 through a network interface or adapter 114. When used in a WAN networking environment, the computer 100 and remote computer 109 may both include a modem 115 or other means for establishing a communications over wide area network 113, such as the Internet. The modem 115, which may be internal or external, is connected to system bus 130 via the serial port interface 106. In a networked environment, program modules depicted relative to the computer 100, or portions thereof, may be stored in the remote memory storage device.

It will be appreciated that the network connections shown are exemplary and other means of establishing a communications link between the computers can be used. The existence of any of various well-known protocols, such as TCP/IP, "ETHERNET", FTP, HTTP and the like, is presumed, and the system can be operated in a client-server configuration to permit a user to retrieve web pages from a web-based server. Procedures of the present invention to be described below can operate within the environment of the computer 100 shown in FIG. 1. Although the invention is generally applicable to a computer operating in accordance with the IEEE 1394 standard, it is not intended to be so limited.

Figure 2:
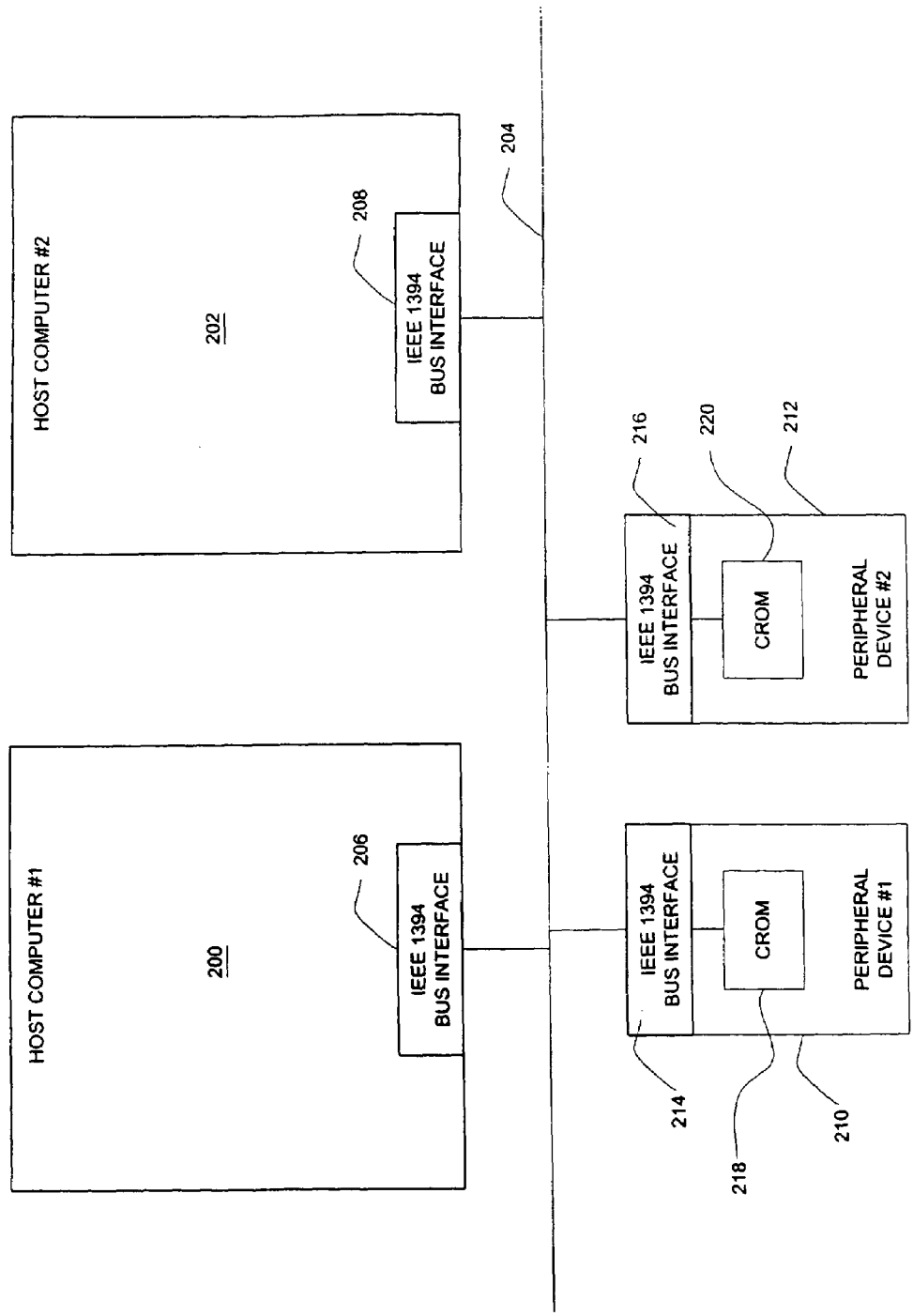
FIG. 2 is a schematic block diagram of an exemplary IEEE 1394 system architecture capable of being used in conjunction with the present invention.

As shown in FIG. 2, one or more computers 200, 202 can be coupled to a communication medium such as an IEEE 1394 bus 204. And, of course, computers 200, 202 connected to an IEEE 1394 bus 204 have IEEE 1394 bus interfaces 206, 208 that enable communication with the computers and other peripherals 210, 212 coupled to the bus. The peripherals 210, 212 similarly have IEEE 1394 bus interfaces 214, 216 that enable communication with the computers as well as other peripherals on the bus 204.

The peripherals 210, 212 also each include a configuration read-only memory (CROM) 218, 220. Although a CROM is customarily used in IEEE 1394-enabled devices 210, 212, any non-volatile memory could be used including, but not limited to, the computer-readable memory examples provided above. In any event, a memory device such as a CROM is preferably used because IEEE 1394 serial devices typically include a ROM directory structure that provides information needed to configure and diagnose problems associated with the peripheral device 210, 212. Information included within the CROM may include information for: identifying the software driver for the device 210, 212, identifying diagnostic software, specifying bus-related capabilities of the device (e.g. whether the device is bus manager capable), and specifying optional module, node, and unit characteristics and parameters.

In addition to the foregoing, the present invention preferably includes one or more drivers (and/or other installation/configuration files) for each operating system with which the peripheral device 210, 212 is intended to operate. For example, the CROM for a device might have drivers for Microsoft Windows® 98, Linux, and/or any other operating system. Thus, any computer 200, 202 connected to the IEEE 1394 bus 204 could load the necessary drivers directly from the peripheral device 210, 212 as soon as the device is detected. This is a significant advantage over the prior art because the computers 200, 202 could automatically load the drivers without requiring user intervention. Current "Plug And Play" and "System File Protection" security mechanisms can still be used so only signed driver software can be installed and downloaded from the device.

In an alternate embodiment, the CROM 218, 220 could store—in addition to drivers or in lieu of drivers—a uniform resource locator (URL) or other pointer to a location that contains the drivers (and/or other installation/configuration files) for various operating systems and devices. Of course, the location could be a local computer-readable medium, network storage device, and/or any site on the Internet. After a computer 200, 202 detects a device 210, 212, the computer could check the CROM 218, 220 for a driver, see the URL or pointer for its particular driver, and then proceed to automatically procure and load the driver without user intervention. This approach would have the added benefit of ensuring that the computers 200, 202 always load the current version of the driver.

Figure 3:
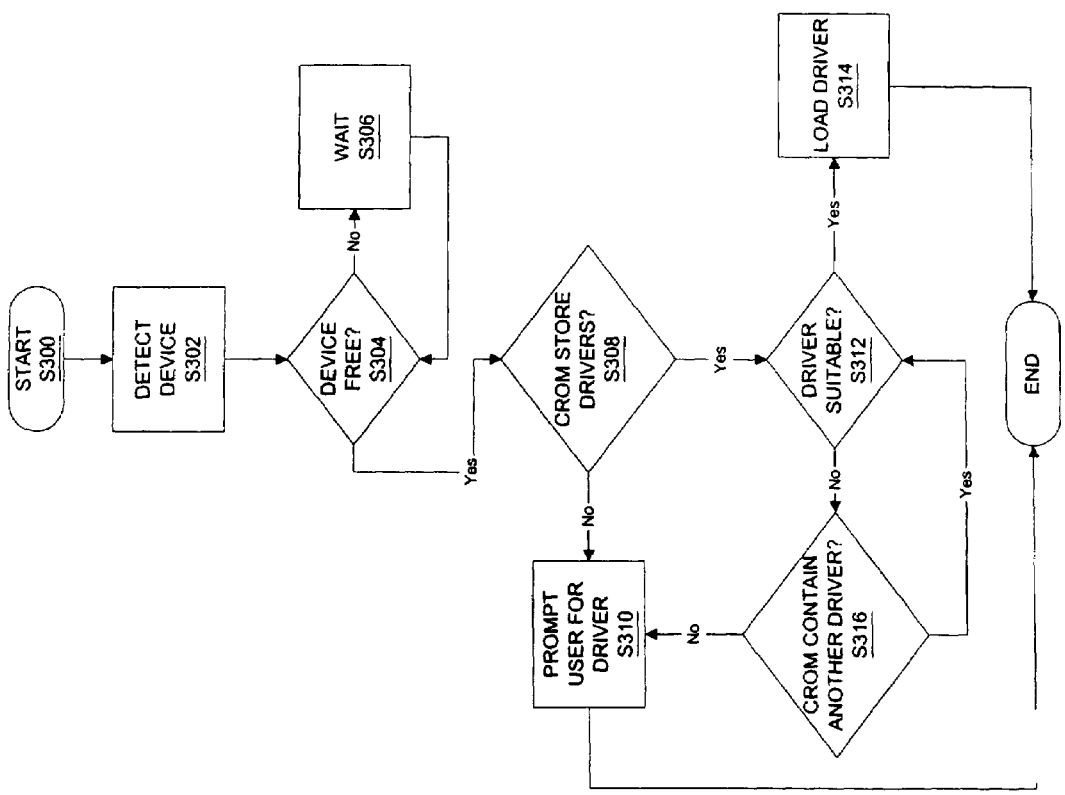
FIG. 3 is a flow chart illustrating an exemplary process of automatically loading device drivers.

A flow chart illustrating an exemplary process of automatically loading device drivers is shown in FIG. 3. An operating system running on a computer 200, 202 is first started at S300. After the operating system is running, the computer 200, 202 can then detect at S302 whenever a device 210, 212 is connected to the bus 204. The device 210, 212 is available to be enumerated the moment it is plugged in. It is always free in this sense since the invention does not need to be able to determine what drivers to load in the normal case. That is in the normal case step S304, checking whether the device is free will be yes and the abnormal case of waiting for the device to be free in step S306 will be avoided. Thereafter, the operating system will check to see if the CROM 218, 220 stores drivers or pointers to drivers at S308. If the CROM does not store the drivers or pointers, then the operating system will conclude that the peripheral device is a legacy device. Consequently, the operating system will prompt its user to manually load the driver in the standard prior-art way of loading drivers S310.

However, if the CROM 218, 220 does store drivers (or pointers), then the operating system will preferably check the first driver to see if it is suitable for use with the operating system at S312. Of course, if the driver is suitable, the operating system will load the driver stored in the CROM at S314. If the driver is not suitable, the operating system will check to see if the CROM contains any other drivers at S316. The present invention will continue this process until it finds the correct driver or runs out of drivers to check. If a suitable driver is found, then it is loaded at S314. If a suitable driver is not found, then the operating system will conclude that the peripheral device is a legacy device and will prompt its user to manually load the driver in the standard prior-art way of loading drivers at S310. Thus, by utilizing this method, each computer 200, 202 coupled to the IEEE 1394 bus 204 can automatically load drivers for peripheral devices coupled to the bus.

In sum, the present invention overcomes the limitations and problems of the prior art by providing an automated solution for installing device drivers on IEEE 1394-enabled devices. In particular, this invention overcomes the problems of the prior art by storing device drivers (and/or other installation/configuration files) for one or more operating systems on a peripheral device's configuration ROM (CROM) or other non-volatile memory. When the device is connected to an IEEE 1394 bus, each computer's operating system will automatically detect the device and poll the device to determine whether the driver information is stored in the CROM. If the device is a legacy device, the user is instructed to manually load the requisite drivers. If the device is manufactured in accordance with the present invention, the operating system automatically loads the drivers and other files from the CROM. Thus, this invention provides automatic loading of drivers for IEEE 1394-enabled devices.

The present invention has been described herein with reference to specific exemplary embodiments thereof. It will be apparent to those skilled in the art that a person understanding this invention may conceive of changes or other embodiments or variations, which utilize the principles of this invention without departing from the broader spirit and scope of the invention as set forth in the appended claims. For example, instead of being implemented in conjunction with IEEE 1394 architecture, the present invention could be used with any serial bus or other communication medium. All are considered within the sphere, spirit, and scope of the invention. The specification and drawings are, therefore, to be regarded in an illustrative rather than restrictive sense. Accordingly, it is not intended that the invention be limited except as may be necessary in view of the appended claims.

The invention claimed is:

1. A system for loading a device driver for an IEEE 1394-enabled device comprising:
   a computer running an operating system;
   an IEEE 1394-enabled device configured to store a device driver or a pointer to a device driver in non-volatile memory; and
   an IEEE 1394-compliant bus configured to couple the IEEE 1394-enabled device to the computer,
   wherein said computer executes the steps of
      detecting that the IEEE 1394-enabled device is coupled to the IEEE 1394-compliant bus;
      responsive to the detecting, determining if either a device driver or a pointer to a device driver compatible with the operating system is stored in the non-volatile memory;
      responsive to the determining, automatically loading the device driver if either a device driver or a pointer to a device driver compatible with the operating system is stored in the non-volatile memory; and
      responsive to the determining, prompting a user to manually load a device driver compatible with the operating system, if neither a device driver nor a pointer to a device driver compatible with the operating system is stored in the non-volatile memory, and
   wherein the pointer includes a uniform resource locator (URL).

2. A system for loading device drivers for an IEEE 1394-enabled device comprising:
   a first computer running a first operating system;
   a second computer running a second operating system;
   an IEEE 1394-enabled device configured to store a device driver or a pointer to a device driver in non-volatile memory; and
   an IEEE 1394-compliant bus configured to couple the IEEE 1394-enabled device to the first computer and the second computer,
   wherein said first computer executes the steps of
      a. detecting that the IEEE 1394-enabled device is coupled to the IEEE 1394-compliant bus;
      b. responsive to step a), determining that either a device driver or a pointer to a device driver compatible with the first operating system is stored in the non-volatile memory; and
      c. responsive to step b), automatically loading the device driver compatible with the first operating system, wherein said second computer executes the steps of
d. detecting that the IEEE 1394-enabled device is coupled to the IEEE 1394-compliant bus;
e. responsive to step d), determining that neither a device driver nor a pointer to a device driver compatible with the second operating system is stored in the non-volatile memory; and
f. responsive to step e), prompting a user to manually load a device driver compatible with the second operating system, and wherein the pointer includes a uniform resource locator (URL).

* * * * *